US012472505B2

(12) United States Patent
Rogers

(10) Patent No.: US 12,472,505 B2
(45) Date of Patent: Nov. 18, 2025

(54) SHREDDER BLADE ASSEMBLY

(71) Applicant: 2SPR, LLC, North Salt Lake, UT (US)

(72) Inventor: Ted Bushman Rogers, West Haven, UT (US)

(73) Assignee: Eco Green Equipment, LLC, North Salt Lake, UT (US)

( * ) Notice: Subject to any disclaimer, the term of this patent is extended or adjusted under 35 U.S.C. 154(b) by 0 days.

(21) Appl. No.: 17/164,505

(22) Filed: Feb. 1, 2021

(65) Prior Publication Data

US 2022/0241910 A1 Aug. 4, 2022

(51) Int. Cl.
*B02C 18/18* (2006.01)
*B02C 18/00* (2006.01)

(52) U.S. Cl.
CPC ........ *B02C 18/182* (2013.01); *B02C 18/0007* (2013.01)

(58) Field of Classification Search
CPC .............. B02C 18/0007; B02C 18/182; B02C 18/0084; B02C 18/06; B02C 18/083; B02C 18/143; B02C 18/18; B02C 18/184; B02C 18/146
USPC .................................................. 241/297, 294
See application file for complete search history.

(56) References Cited

U.S. PATENT DOCUMENTS 4,607,800 A * 8/1986 Barclay ................. B02C 18/184 241/DIG. 31
4,901,929 A * 2/1990 Barclay ................. B02C 18/142 241/294
7,100,855 B2 * 9/2006 Diemunsch ........... B02C 18/184 241/DIG. 31
7,900,861 B2 * 3/2011 Sharp .................... E02F 9/2866 241/294
7,959,099 B1 * 6/2011 Cox ........................ B02C 18/18 241/294
9,016,284 B2 * 4/2015 Tilley ....................... A24C 5/00 131/117
2015/0336103 A1 * 11/2015 Rogers .................... B02C 18/18 241/294
2017/0095821 A1 * 4/2017 Lyman .................... B02C 13/04

* cited by examiner

*Primary Examiner* — Christopher L Templeton
*Assistant Examiner* — Teresa A Guthrie
(74) *Attorney, Agent, or Firm* — Travis Banta; Loyal IP Law, PLLC

(57) ABSTRACT

A shredder blade assembly includes a rotor having a plurality of pockets. The shredder blade assembly further includes a plurality of knife blades which are each disposed in one of the plurality of pockets. The knife blades are secured into the pockets by a compression force applied from a periphery of the rotor and in a direction towards a shaft aperture in the rotor.

15 Claims, 8 Drawing Sheets

SHREDDER BLADE ASSEMBLY

BACKGROUND

1. Technical Field

This disclosure relates to a shredder blade assembly which incorporates a plurality of knife blades for shredding waste products. More specifically, the shredder blade assembly includes a plurality of knife blades, each of which has a plurality of cutting edges. The plurality of knives is connected to a rotor in the shredder blade assembly in a manner that makes blade replacement and adjustment a simple task while at the same time maintaining the resilience and durability of the shredder blade assembly.

2. Description of the Related Art

Shredding machines are used to decrease the size of objects. Paper shredders, for example, cut sheets of paper into multiple strips at the same time to reduce the overall size of the paper, even though the volume of the paper before and after shredding is relatively consistent. Paper shredders have also been used for many years to dispose of documents that are sensitive in nature. Fortunately, materials such as paper are easily shredded because the material qualities of paper lend it to relatively easy tearing which means a low degree of robustness is necessary for a paper shredder. Paper is soft and pliable enough so as to be unlikely to cause damage to a paper shredder.

More recently, shredding machines have been developed for shredding all types of waste, including general trash, metal, wood, stone, concrete, plastic, rubber, and other natural and synthetic materials. Shredding for these materials is desirable for various reasons. In some cases, shredding can be useful in encouraging the natural degradation of products in a landfill because more shredded materials fit in the same amount of space in a landfill as compared to unshredded materials. In other instances, shredding materials may facilitate recycling of the materials in that used materials may be reclaimed for use as raw materials. For example, rubber tires may be shredded for the purpose of reclaiming the rubber and steel for use in other products. Once shredded to an appropriate size, the steel can be recycled and the rubber from the tires may be remolded, and used to make other products, lessening the need for new raw materials in many cases.

Shredding machines, due to the nature of the task they perform, are subject to intense stress during the shredding of various materials. Shredding machines typically contain a plurality of individual shredder blades mounted on parallel counter rotating shafts. The shredder blades rely on gravity and the rotation of the blades on the parallel counter rotating shafts to pull materials into the blades which are then cut into smaller size as the materials are forced through the blades. Blades may be positioned such that a counter rotating blade is positioned on a first shaft between two blades on an opposing second shaft such that the counter rotating blade on the first shaft does not contact the two blades on the opposing second shaft or the second shaft itself.

Due to the relative hardness of some shredded materials, the blades of the shredder blade are frequently dulled and worn. Conventional shredder blades are either cast and subsequently sharpened along cutting edges or use knives that are bolted to the shredder blade. Depending on the size and number of shredder blades in a shredding machine, thousands to tens of thousands or more of separate cutting surfaces must be resharpened or replaced. Both resharpening and knife replacement are a significant investment in manpower. In many cases, replacing and resharpening a shredder blade, or its constituent knives, may occupy multiple workers for multiple days, which is a significant expense to the shredder blade owner or the employer. The expenses are only multiplied when multiple shredder blades are incorporated into the same shredding machine. The work associated with sharpening the cutting edges or replacing knives is multiplied by the number of shredder blades in a shredding machine. Such a situation also causes machine downtime during which no value is being realized from the shredding machine.

Accordingly, a need exists for a shredder blade assembly which requires less machine downtime to replace knife blades. It is one object of this disclosure to provide a shredder blade assembly which uses a removable pin to secure a set of knife blades to a rotor. It is another object of this disclosure to provide a shredder blade which includes pockets to receive the knife blades into the rotor when pinned in place. It is a further object of this disclosure to secure the pin in place by compression force.

SUMMARY

Disclosed herein is a shredder blade assembly which includes a rotor having a plurality of pockets. The shredder blade assembly further includes a plurality of knife blades which are each disposed in one of the plurality of pockets. The knife blades are secured into the pockets by a compression force applied from a periphery of the rotor and in a direction towards a shaft aperture in the rotor.

Further disclosed herein is a shredder blade rotor. The shredder blade rotor includes a rotor body comprising a plurality of pockets. The shredder blade rotor further includes a plurality of rotor apertures disposed on an inside surface of the plurality of pockets. The shredder blade rotor further includes a plurality of detent screw holes each disposed in a periphery of the rotor body and extending through the rotor to one of the plurality of rotor apertures.

Further disclosed herein is a shredder blade assembly which comprises a plurality of knife blades. The plurality of knife blades may be disposed on opposing sides of a rotor and are connected by a pin extending through a rotor aperture. The shredder blade assembly may further include a detent screw hole which extends from a periphery of the rotor to the rotor aperture.

BRIEF DESCRIPTION OF THE DRAWINGS

The accompanying drawings illustrate various embodiments of a shredder blade system.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate the techniques and embodiments may also be practiced in other similar devices.

Reference is now made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may alternatively be included in another embodiment or figure regardless of whether or not those elements are shown or described in another embodiment or figure. In other words, elements in the figures may be interchangeable between various embodiments disclosed herein, whether shown or not.

Figure 1:
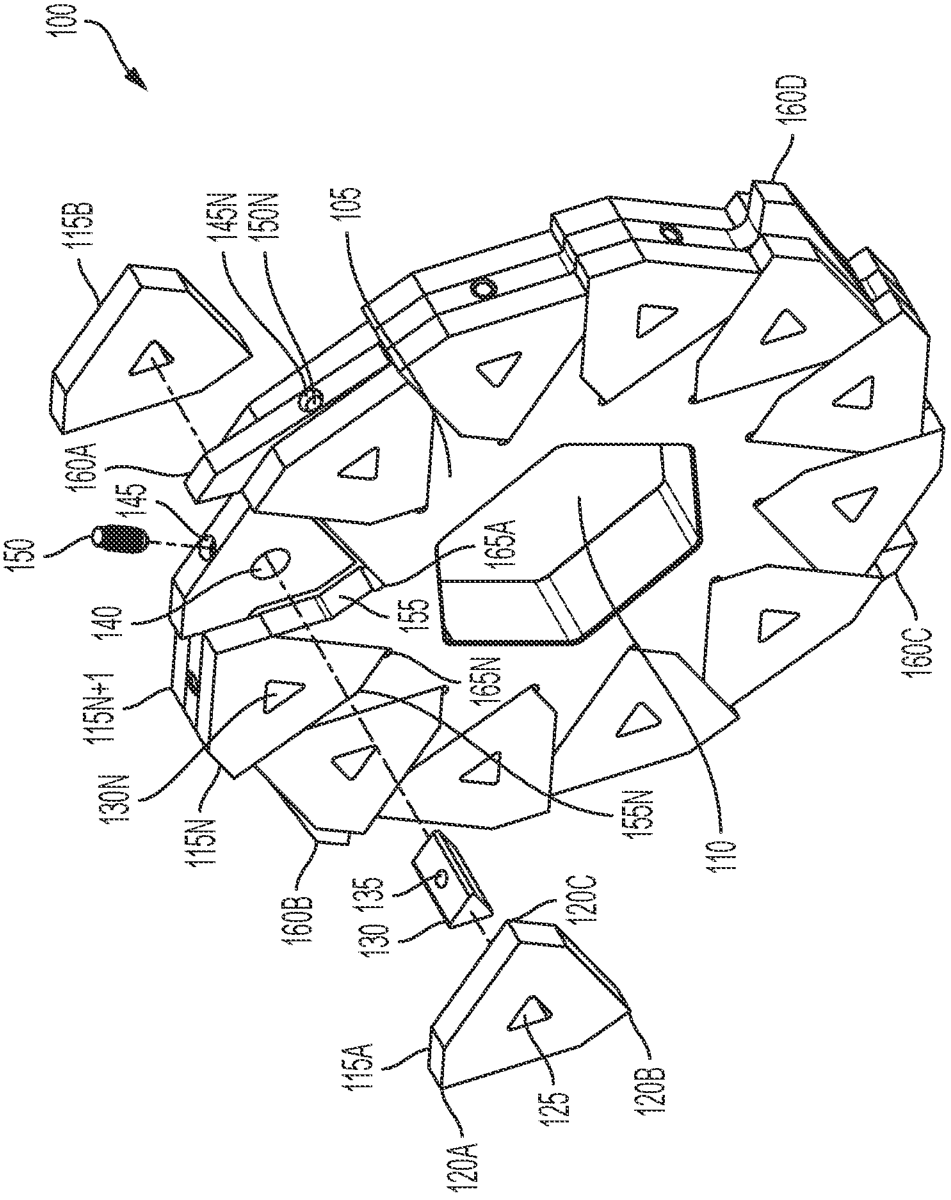
FIG. 1 illustrates an exploded perspective view of a shredder blade assembly.

FIG. 1 illustrates an exploded perspective view of a shredder blade assembly 100. Shredder blade assembly 100 includes a rotor 105. Rotor 105 may be formed from a metal. Exemplary metals may include various hardnesses of steel alloys, iron, tool steel, or other metals apparent to those of ordinary skill in the art. Rotor 105 may include a shaft aperture 110 which allows rotor 105 to be mounted on a shaft for rotation, as will be discussed below. Shaft aperture 110 may preferably be hexagonal but may also be implemented in any polygonal or non-circular shape. Rotor 105 may further include a plurality of knife blades 115A, 115B, . . . 115N, 115N+1 (collectively referred to as knife blades 115N). Any number of knife blades 115N may be implemented on rotor 105 using the techniques described herein and depending on the relative size and circumference of rotor 105. Pairs of knife blades 115N (such as knife blade 115A and knife blade 115B) may be indexed, such that each pair of knife blades 115N are aligned with each other across a cutting face.

Knife blade 115A is representative of knife blades 115N and includes three cutting edges 120A, 120B, and 120C. As shown in FIG. 1, cutting edges 120A, 120B, and 120C extend across a thickness of knife blade 115A and may therefore include an inside cutting edge on an inside edge of knife blade 115A and an outside cutting edge on an outside edge of knife blade 115A. In this manner, cutting edges 120A, 120B, and 120C may each include an inside cutting edge and an outside cutting edge, which makes knife blade 115A reversible. An inside cutting edge may refer to a side of knife blade 115A that is proximate to or in contact with rotor 105 while an outside cutting edge may refer to a side of knife blade 115A that is opposite the inside cutting edge or not in direct contact with rotor 105.

Each of cutting edges 120A, 120B and 120C are disposed at approximately 120° from each other (within machining tolerances). In this manner, a knife blade 115A is also rotatable to expose a new cutting edge. For example, when an outside edge of cutting edge 120A has been dulled through shredding operations, knife blade 115A may be rotated 120° such that, for example, an outside edge of knife blade 120B may be exposed for cutting. When outside edge of cutting edge 120B of knife blade 115A is dulled through shredding options, knife blade 115A may again be rotated 120° such that, for example, an outside edge of cutting edge 120C of knife blade 115A may be exposed for cutting.

When outside edges of cutting edges 120A, 120B, and 120C have each been dulled through shredding operations, knife blade 115A may be reversed to expose a new inside cutting edge on each of cutting edges 120A, 120B, and 120C, which may each be similarly used during shredding operations until dulled. When each of the inside and outside edges of cutting edges 120A, 120B, and 120C have been dulled, knife blade 115 may be removed and replaced with a new or resharpened blade.

Knife blade 115A may include a pinning aperture 125 which receives pin 130. As shown in FIG. 1, pinning aperture 125 is implemented as a complementing pin 130 with three individual faces, in a triangular shape. Pin 130 need not explicitly include three individual faces or be a triangular shape. Pin 130 may be implemented as a circle, for example. In other embodiments, pin 130 may be implemented as a polygon with a number of faces that are evenly divisible by three. For example, in addition to a circle, a triangle, a hexagon, a nonagon, and etc. Other embodiments of pin 130 are shown with respect to FIG. 5 below.

Pin 130 may be disposed within pinning aperture 125 and be secured in place by a friction fit within pinning aperture 125. Pinning aperture 125 and pin 130 may be correspondingly chamfered, tapered, or keyed using techniques known in the art, and as described below, to enhance the fit and ensure that knife blade 115A is securely attached to pin 130. Pin 130 may also connect to knife blade 115B by a friction fit or using the same chamfering, tapering, keying, or other techniques known in the art. Pin 130 may be disposed through rotor 105, as shown in FIG. 1 which secures knife blades within pocket 155 on rotor 105 through rotor aperture 140. Rotor aperture 140 may be a circular hole disposed within rotor 105 which facilitates connection of pin 130 to both knife blade 115A and 115B. When in position, pin 130 cannot contact rotor aperture 140 but may, in some embodiments, contact rotor aperture 140 at one or two of the vertices of pin 130, for example, (where each face of pin 130 meets another one of the faces of pin 130).

Ideally, pin 130 may be keyed by pin aperture 125 in knife blades 115A and 115B within pocket 155 to position pin 130 in a manner such that detent screw 150 may be disposed within detent screw hole 145 to contact detent 135 in pin 130. In this manner, aligning detent 135 with detent screw hole 145 makes inserting detent screw 150 a simple matter. Since pocket 155, knife blade 115A, knife blade 115B, and pin aperture 125 are keyed, detent screw 150 may contact detent 135 simply by screwing detent screw 150 into detent screw hole 145. Since detent screw 150 and detent screw hole 145 are correspondingly threaded, significant compression forces may be applied to pin 130 via detent 135, which will be discussed below.

Pocket 155 may be a recess milled or cast into both outside surfaces of rotor 105 (e.g., front, and back of rotor 105) in a shape corresponding to the shape of knife blade 115 such that pocket 155 and knife blade 115A, for example, are complimentary shapes. Knife blade 115A may be disposed in pocket 155 such that an outside edge of knife blade 115A is flush or flat with respect to an outside surface of rotor 105. Rotor 105 may include a plurality of pockets 155N (of which pocket 155 is representative for purposes of discussion) corresponding to each of the plurality of knife blades 115N. Indeed, each of the foregoing structures may be repeated in each of knife blades 115N, such that shredder blade assembly includes a plurality of knife blades 115N, a plurality of pins 130N, a plurality of rotor apertures 140N, a plurality of detent screw holes 145N, and a plurality of detent screws 150N, and a plurality of pockets to each accommodate a pair of the plurality of knife blades 115N disposed on rotor 105. In other words, the foregoing description of attaching knife blade 115A and knife blade 115B to rotor 105 may apply to each of knife blades 115N.

Rotor 105 may further include a plurality of agitation knives 160A, 160B, 160C, and 160D which may be positioned around the rotor in 90° increments. Agitation knives may be used to "control" larger material into the plurality of knife blades 115N. For example, large pieces of material may be sized or shaped such that knife blades 115N cannot easily obtain purchase on the material, which may cause the material to roll on top of shredder blade assembly 100 for a period of time until knife blades 115N "grab" or obtain purchase on the material. Agitation knives 160A-160D may facilitate pulling the material down into knife blades 115N or may cut, shear, or rip larger pieces from the material which may be appropriately sized to encounter knife blades 115N for shredding.

Rotor 105 may further include a knife blade recess 165A within pocket 155 which is milled or cast into pocket 155 to facilitate removal of knife blades 115N from rotor 105. Each one of pockets 155N may include a knife blade recess 165N. Knife blade recesses 165N may provide a small gap which allows a user to insert a tool into knife blade recess 165N to force knife blade 115N to separate from rotor 105 when knife blade 115N is to be rotated or reversed.

In practice, and referring to knife blade 115A and 115B as representative of knife blades 115N and other corresponding parts, knife blades 115A and 115B are secured in pocket 155 by compression forces which serves two purposes. First, knife blades 115A and 115B are securely held within pocket 155 and withstand the pressures and stresses of shredding materials. Second, knife blades 115A and 115B may be easily removed, rotated, or reversed in a manner that requires substantially less time than conventional shredder blades because each knife blade 115N includes only a single pinning aperture 125.

In this manner, pin 130 may be inserted into pinning aperture 125 of knife blade 115A and into a corresponding pinning aperture in knife blade 115B through rotor aperture 140. Knife blades 115A and 115B may be friction fit, using the techniques described above, to pin 130. Knife blades 115A and 115B are held in pockets 155 and 155N as pockets 155 and 155N are shaped in a complimentary fashion to the shape of knife blades 115A and 115B (with the exception of knife blade recess 165A). Accordingly, the material rigidity and strength of rotor 105 is used to support knife blade 115A and 115B in position on rotor 105 and ensures that during rotation, knife blade 115A and 115B enjoy sufficient support to cut, shred, or shear material. At the same time, pin 130 is installed in rotor 105 such that detent screw 150 encounters detent 135 in pin 130. As detent screw 150 is screwed into pin 130 via detent screw hole 145, compression is applied to pin 130, which compresses knife blades 115A and 115B into pocket 155 and pocket 155N. This compression force applied to knife blade 115A and 115B via pin 130 and detent screw 150 further ensures the rigidity and strength of knife blade 115A and 115B within pocket 155 and pocket 155N, respectively. It is noted that in this practical example, knife blade 115A, knife blade 115B, pin 130, detent screw hole 145, detent screw 150, pocket 155, and etc. are merely representative of corresponding elements on rotor 105 with respect to knife blades 115N which function in the same manner and are discussed above.

Thus, a single screw, detent screw 150A, and pin 130 may allow a simple and time saving rotation, reversal, or replacement of one of a plurality of knife blades 115N.

Figure 2:
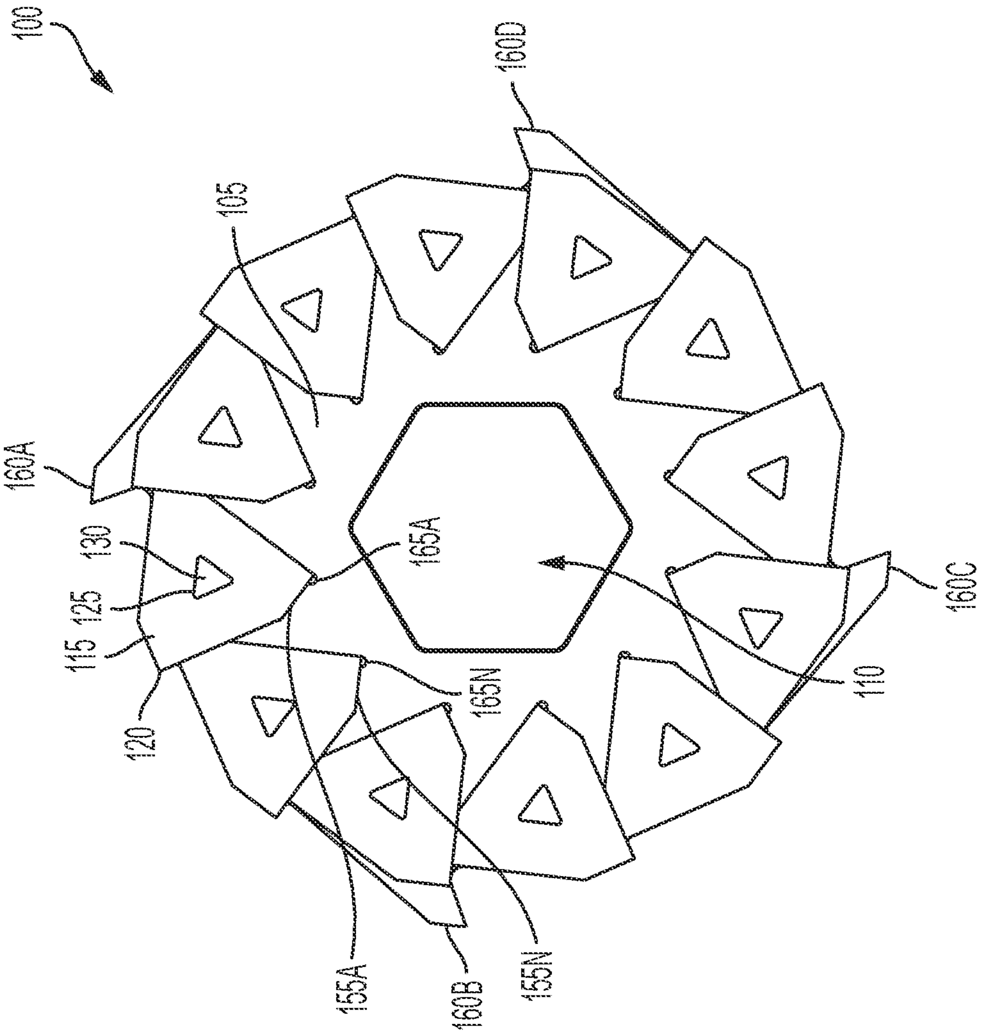
FIG. 2 illustrates a side view of the shredder blade assembly.

FIG. 2 illustrates a side view of shredder blade assembly 100, also shown in FIG. 1. Shredder blade assembly 100 includes a rotor 105, shown and discussed above with respect to FIG. 1. Rotor 105 further includes a shaft aperture 110 disposed through a center of rotor 105. Shaft aperture 110 allows rotor 105 to be mounted on a shaft for rotation, as will be discussed below. Shaft aperture 110 may preferably be hexagonal but may also be implemented in any polygonal or non-circular shape. Knife blade 115 may include a cutting edge 120 and may be installed around the periphery of rotor 105 and within pocket 155A. Knife blade 115 may include a pinning aperture 125 which accepts pin 130 to hold knife blade 115 within pocket 155A. As shown in FIG. 2, a plurality of pockets 155N are milled into the outside surfaces (e.g., front, and back) of rotor 105 to accept pairs of knife blades 115N and 115N+1, shown in FIG. 1.

Pocket 155A further includes a knife blade recess 165A which allows a tool to be inserted to remove a knife blade 115 from a rotor 105 in the case that the knife blade becomes stuck or jammed within pocket 155A by shredded materials, pressure, unintentional deformation, breakage, or for any other reason. Knife blade recess 165A may also allow air to flow between rotor 105 and knife blade 115 to ensure that a vacuum is not created which tends to hold knife blade 115 in pocket 155A, making removal of knife blade 115 from rotor 105 a less time intensive task. Each of the plurality of pockets 155N includes a knife recess 165A.

Rotor 105 may further include a plurality of agitation knives 160A, 160B, 160C, and 160D which may be positioned around the rotor in 90° increments, or any number of agitational knives spaced at any angle around a periphery of rotor 105. Agitation knives 160A, 160B, 160C, and 160D may be used to "obtain" larger material before reaching the plurality of knife blades 115N. For example, large pieces of material may be sized or shaped such that knife blades 115N cannot easily obtain purchase on the material, which may cause the material to roll on top of shredder blade assembly 100 for a period of time until knife blades 115N "grab" or obtain purchase on the material. Agitation knives 160A-160D may facilitate pulling the material down into knife blades 115N or may cut, shear, or rip larger pieces from the material which may be appropriately sized to encounter knife blades 115N for shredding.

Figure 3:
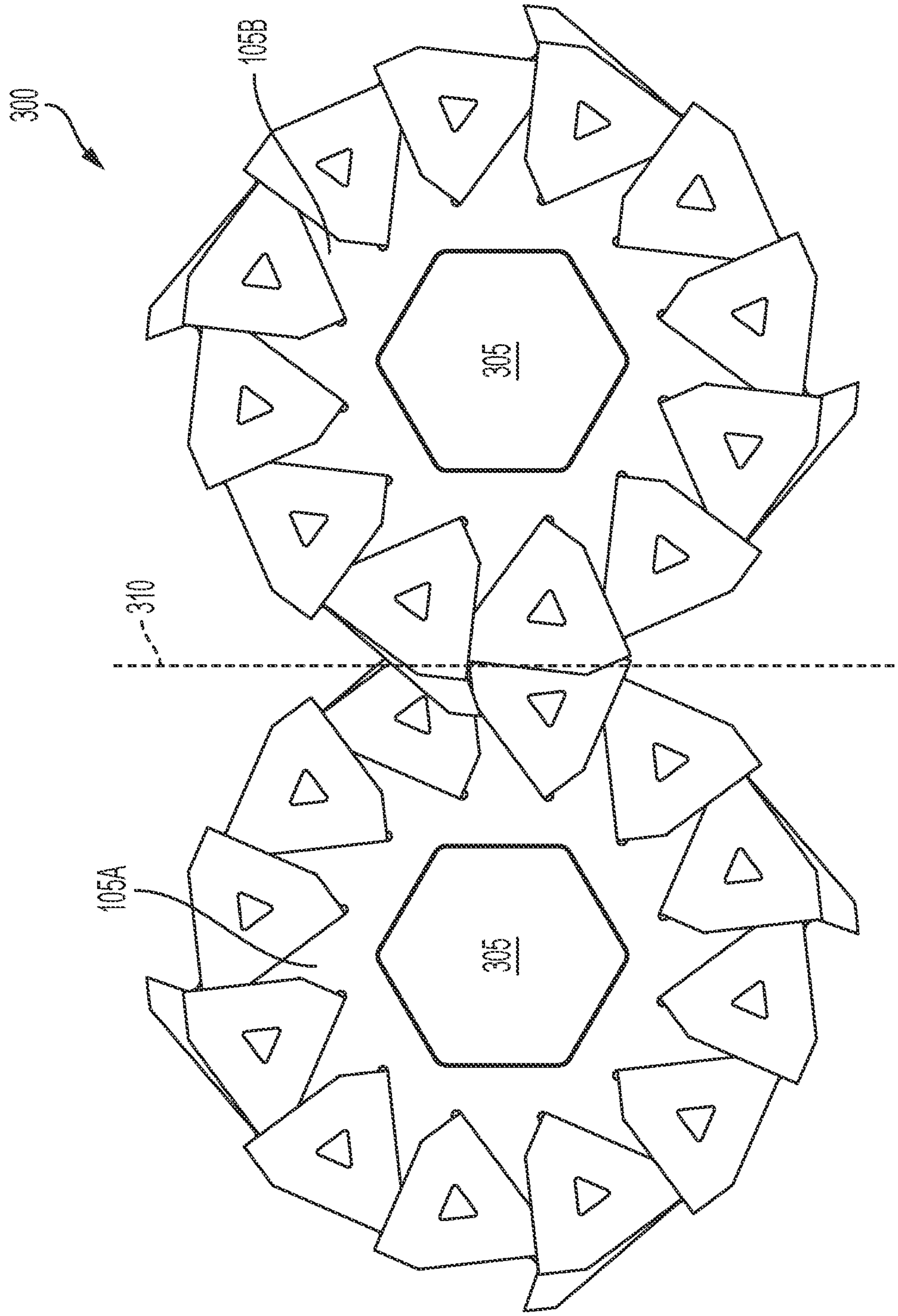
FIG. 3 illustrates a side view of a plurality of shredder blade assemblies as positioned in a shredding machine.

FIG. 3 illustrates a side view of a plurality of shredder blade assemblies 100, shown in FIG. 1 as positioned in a shredding machine 300. As shown in FIG. 3, rotor 105A, shown in FIG. 1 and discussed above, is positioned on a shaft 305 which is illustrated for rotation in a clockwise direction (e.g., rotor 105 as shown in FIG. 1 is rotated such that instead of being positioned in a counter-clockwise direction as shown in FIG. 1, rotor 105 is positioned to rotate in a clockwise direction on shaft 305 and designated as rotor 105A in FIG. 3). Rotor 105B, shown in FIG. 1 and discussed above, is positioned on a shaft 305 which rotates in a counter-clockwise direction (e.g., rotor 105 as shown in FIG. 1 is installed on shaft 305 to rotate in a counter-clockwise direction and is designated as rotor 105B in FIG. 3). Rotor 105B is positioned in front of but immediately adjacent to rotor 105A. While not shown in FIG. 3, due to perspective, multiple rotors 105 may be implemented on each of shafts 305 such that another rotor may be positioned behind rotor 105B and immediately behind but adjacent to rotor 105A. In this example, rotor 105A would rotate in a clockwise direction between two of rotors 105B which rotate in a counter-clockwise direction. Such a configuration may be repeated such that a number of rotors, limited only by practicality, may be disposed along shafts 305 and rotating in clockwise and counter-clockwise directions to create shredding machine 300. A shredding plane 310 is a center line between rotor 105A and rotor 105B where shreds of material from a larger piece of material are cut and which pass between rotor 105A and rotor 105B.

Figure 4:
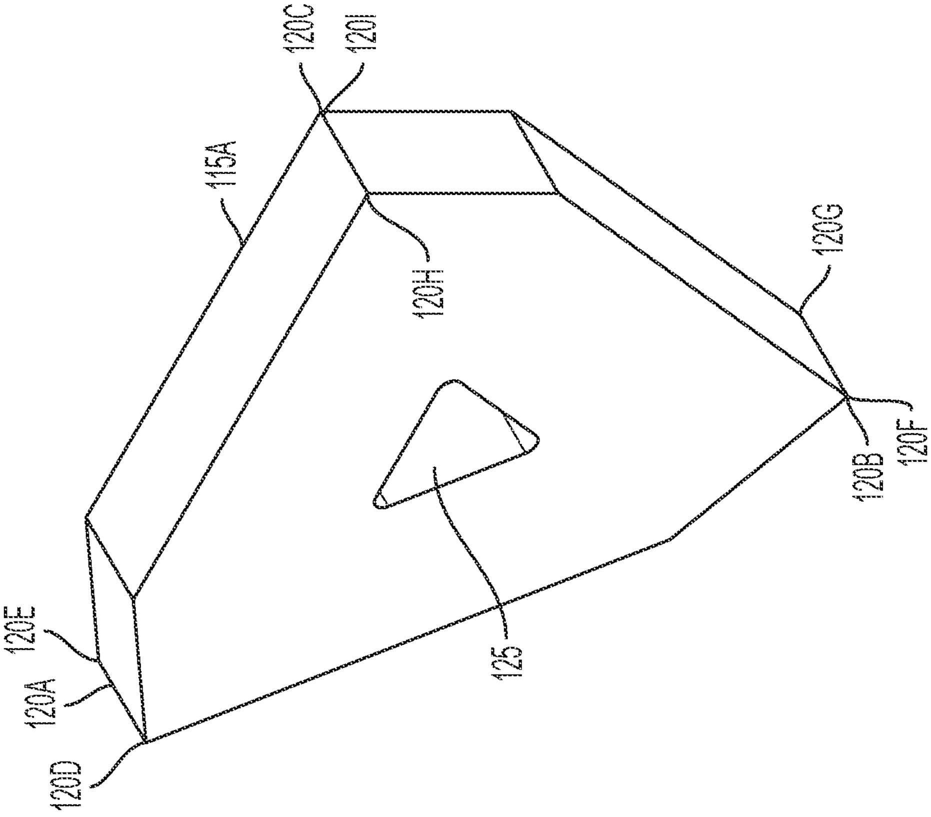
FIG. 4 illustrates a perspective view of a knife blade associated with the shredder blade assembly.

FIG. 4 illustrates a perspective view of a knife blade associated with the shredder blade assembly 100, shown in FIG. 1. As previously discussed, shredder blade assembly 100 may include a knife blade 115A. Knife blade 115A may be representative of knife blades 115A, 115B, . . . 115N, 115N+1. Knife blade 115A may be polygonal in shape, having six irregular faces, three long faces each between three shorter faces. Alternatively, knife blade 115A may include six regular faces in a hexagonal shape with a pocket 155A shaped to receive knife blade 115A. Each of the shorter faces may include a cutting edge 120A, 120B, and 120C. Further, each of cutting edges 120A, 120B, and 120C may each have an outside cutting edge and an inside cutting edge. For example, cutting edge 120A may include an outside cutting edge 120D and an inside cutting edge 120E. Cutting edge 120B may include an outside cutting edge 120F and an inside cutting edge 120G. Cutting edge 120C may include an outside cutting edge 120H and an inside cutting edge 120I. In this manner, each outside cutting edge 120D, 120F, and 120H may be used by rotating knife blade 115A in pocket 155A of rotor 105 (shown in FIG. 1) until dulled. When each of outside cutting edge 120D, 120F, and 120H are dulled, knife blade 115A may be reversed in pocket 155A on rotor 105 (shown in FIG. 1) to expose inside cutting edges 120E, 120G, and 120I on a face of rotor 105 (e.g., inside cutting edges 120E, 120G, and 120I take the place of outside edges 120D, 120F, and 120H, and vice versa).

Knife blade 115 may further include a pinning aperture 125. As previously discussed, pinning aperture 125 is implemented as a hole with three individual faces, in a triangular shape. Pinning aperture 125 need not explicitly include three individual faces or be a triangular shape. Pinning aperture 125 may be implemented as a circular hole, for example. In other embodiments, pinning aperture 125 may be implemented as a polygon with a number of faces that are evenly divisible by three. For example, in addition to a circle, a triangle, a hexagon, a nonagon, and etc. may be appropriate implementations for pinning aperture 125 so long as pin 130, shown in FIG. 1, is complimentarily shaped. Pin 130 may be disposed within pinning aperture 125 and be secured in place by a friction fit within pinning aperture 125. Pinning aperture 125 and pin 130 may be correspondingly chamfered, tapered, or keyed using techniques known in the art, and as described below, to enhance the fit and ensure that knife blade 115A is securely attached to pin 130. Pin 130 will be discussed below, with the understanding that pinning aperture 125 is complimentarily shaped to accept pin 130 in a friction fit connection.

Figure 5A:
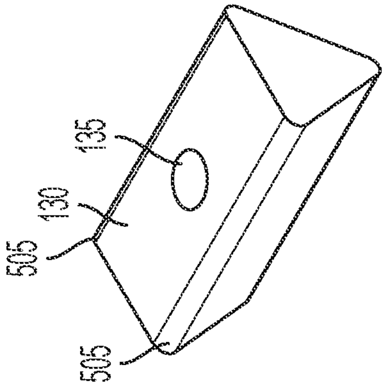
FIG. 5A illustrates a perspective view of a first embodiment of a pin associated with the shredder blade assembly.

FIG. 5A illustrates a first embodiment of a pin 130 associated with shredder blade assembly, shown in FIG. 1. As shown in FIG. 5A, pin 130 may include a chamfer 505 on each of the vertices of pin 130 (regardless of shape, although a triangular shape is illustrated). Pin 130 may further include a detent 135 which accepts detent screw 150, shown in FIG. 1, which will also be discussed below. Detent 135 may be indented in a hemispherical shape and sized to accept an outdented hemispherical end to detent screw 150, as will be discussed below. Pin 130 shown in the embodiment of FIG. 5A is simply chamfered for facilitating simple connection with a complimentary pinning aperture 125 in knife blade 115N.

Figure 5B:
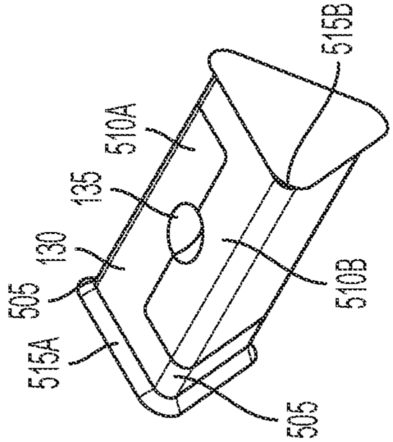
FIG. 5B illustrates a perspective view of a second embodiment of a pin associated with the shredder blade assembly.

FIG. 5B illustrates a perspective view of a second embodiment of a pin 130 associated with the shredder blade assembly 100, shown in FIG. 1. As shown in FIG. 5B, pin 130 may also include chamfer 505 on the vertices of pin 130 (regardless of shape, although a generally triangular shape is illustrated). Pin 130 may further be separated into a first pin portion 510A and a second pin portion 510B. First pin portion 510A and second pin portion 510B may be mirror images of each other and fit together as complimentary shapes, being split through a center of detent 135. In this manner when detent screw 150 is applied to detent 135, equal compression force is applied to each of first pin portion 510A and second pin portion 515B. As previously discussed, detent 135 may be indented in a hemispherical shape and sized to accept an outdented hemispherical end of detent screw 150.

Pin 130 may further include an end chamfer 515A and 515B on opposing ends of pin 130. End chamfer 515A and 515B may be complimentary with pin aperture 125 of knife blade 115N shown in FIG. 1. In this manner, and referring to FIG. 1, knife blade 115A and 115B, for example, may be installed in respective pockets 155A and 155N on rotor 105. Once so positioned, first pin portion 510A may be installed from an outside of knife blade 115A through pinning aperture 125 and rotor aperture 140 while second pin portion 510B is installed from an outside of knife blade 115B through a corresponding pinning aperture in knife blade 115B. An outside portion of chamfer 515A of first pin portion 510A may be disposed in pinning aperture 125 to be flush with an outside of knife blade 115A. An outside portion of chamfer 515B of second pin portion 510B may be disposed in the corresponding pinning aperture in knife blade 115B and to be flush with an outside of knife blade 115B. In this manner, first pin portion 510A and second pin portion 510B may each be inserted through rotor aperture 140. Ideally, at least a portion of first pin portion 510A extends into the corresponding pinning aperture in knife blade 115B while at least a portion of second pin portion 510B extends into pinning aperture 125 in knife blade 115A.

In this manner, force applied to detent 135 by detent screw 150, shown in FIG. 1 may not only be equally applied to first pin portion 510A and second pin portion 510B, but the forces may also be equally applied to pinning aperture 125 of knife blade 115A and the corresponding pinning aperture of knife blade 115B. As detent screw 150 applies compression force to detent 135, first pin portion 510A and second pin portion 510B tend to separate but are held together by pinning apertures in knife blades 115A and 115B. At the same time, the compression force pushes knife blades 115A and 115*b* into pockets 155A and 115N, respectively, of rotor 105 and maintains knife blades 115A and 115B in the desired position. This second embodiment of pin 130 shown in FIG. 5B may also facilitate easy removal of pin 130 when a knife blade, such as knife blades 115A and 115B are to be rotated, reversed, or replaced.

Figure 5C:
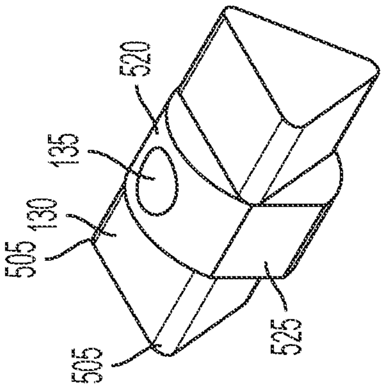
FIG. 5C illustrates a perspective view of a third embodiment of a pin associated with the shredder blade assembly.

FIG. 5C illustrates a perspective view of a third embodiment of a pin 130 associated with shredder blade assembly 100, shown in FIG. 1. As shown in FIG. 5A, pin 130 may include a chamfer 505 on each of the vertices of pin 130 (regardless of shape, although an irregular triangular shape is illustrated). Pin 130 may further include a detent 135 which accepts detent screw 150, shown in FIG. 1, which will also be discussed below. Detent 135 may be indented in a hemispherical shape and sized to accept an outdented hemispherical end to detent screw 150, as will be discussed below.

Pin 130 may include a portion 520 of the pin that includes a second shape. For example, pin 130 may include a portion 520 that is circular across at least one face of pin 130. As shown in FIG. 5, detent 135 may be disposed in a portion 520 of pin 130 to raise a height of detent 135. At the same time, a flat face 525 may also be disposed between a circular portion 520 of pin 130. Portion 520 may or may not contact rotor aperture 140, shown in FIG. 1 while flat 525 may never come into contact with rotor aperture 140. Broadly stated, pin 130 need not be a particular shape and may include portions which incorporate other shapes for, for example, raising a height of the detent for a particular implementation of shredder blade assembly 100.

Figure 5D:
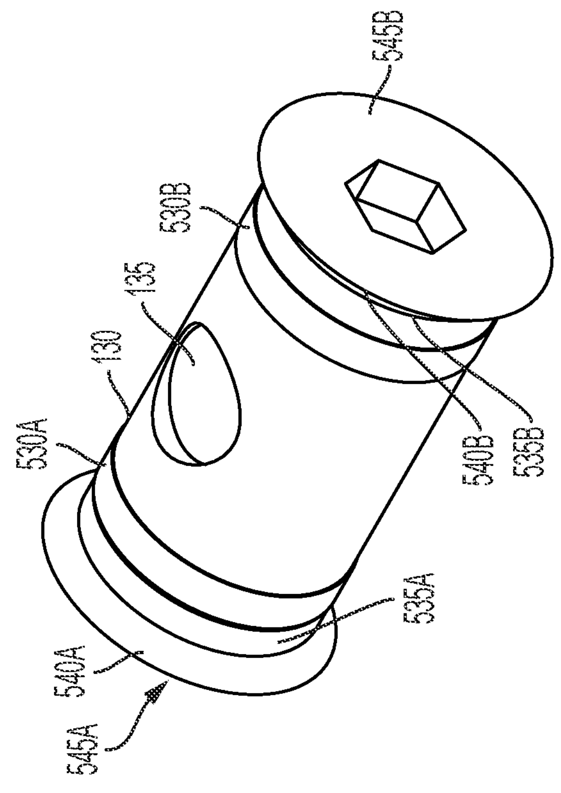
FIG. 5D illustrates a perspective view of a fourth embodiment of a pin associated with the shredder blade assembly.

FIG. 5D illustrates a perspective view of a fourth embodiment of a pin 130 associated with shredder blade assembly 100, shown in FIG. 1. Pin 130 may include a detent 135, as discussed with respect to other embodiments of pin 130 discussed herein. While detent 135 is shown as being round or hemispherical, detent 135 is not so limited and may be fashioned using conical or other shapes or may include a flat face, as will be discussed below. Pin 130, as shown in FIG. 5D may include a pin top 530A and a pin bottom 530B which each accept a pin screw 545A and pin screw 545B, respectively. Pin screw 545A and pin screw 545B may be threaded into pin top 530A and pin bottom 530B in a manner that tightly affixes pin screw 545A and pin screw 545B to pin 130.

In this embodiment, pin aperture 125 of knife blade 115A, shown in FIG. 1, and a corresponding aperture in knife blade 115B, also shown in FIG. 1, may be round to accept pin 130. It is also noted that such a configuration using pin 130 shown in FIG. 5D may be repeated through the plurality of knife blades 115N (e.g., each knife blade associated with shredder blade assembly 100). In such a case, pin screw 545A and pin screw 545B may include chamfers 540A and 540B, respectively, which mate with corresponding knife blades 115N and 115N+1. That is, a reverse chamfer corresponding to chamfer 540A and chamfer 540B may be cut or milled into each side of an aperture, such as aperture 125 in knife blade 115A (and corresponding apertures and knife blades 115N). In this manner, pin screws 545A and 545B may be installed from an outside surface of knife blade 115N by screwing pin screw 545A through pin aperture 125 in knife blade 115A and pin screw 545B through a corresponding pin aperture in knife blade 115B, for example, and into pin 130 which may be disposed within rotor aperture 140. Detent screw 150 may be applied to pin 130 via detent 135 (which may be implemented by a flat face on pin 130 that allows detent screw 150 to turn on pin 130) within rotor aperture 140. In the embodiment of FIG. 5D, pin 130 is secured to knife blades 115N and 115N+1 by pin screws 545A and 545B through rotor aperture 140, ensuring knife blades 115N and 115N+1 cannot unintentionally become forced loose from rotor pockets 155N. Detent screw 150 may still apply pressure to pin 130, which applies pressure via pin 130 on knife blades 115N and 115N+1 to remain within pockets 155N in rotor 105.

Figure 6A:
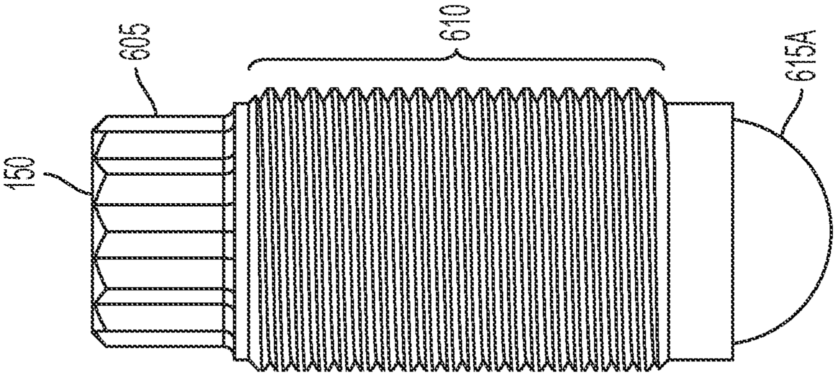
FIG. 6A illustrates a side view of a detent screw associated with the shredder blade assembly.

FIG. 6A illustrates a side view of detent screw 150 associated with shredder blade assembly 100, shown in FIG. 1. As shown, detent screw 150 includes a head 605 which may be similar to a bolt head that may either include an external bearing surface (as shown in FIG. 6A) or a socket bearing surface like, for example, a Torx® or allen bolt. Detent screw 150 may include threaded section 610 which mates with rotor 105 at detent screw hole 145N. Detent screw 150 may further be implemented with hemispherical outdent 615A. In one embodiment, detent screw 150 may be milled to accept a ball bearing of a particular size that is pressure fit and permanently installed into a milled opening on detent screw 150. It is to be noted that detent screw 150 and detent 135 need not be limited specifically to hemispherical shapes, as shown and discussed below, although it is referred to as being "hemispherical," herein for purposes of convenience. It is conceivable that other complimentary outdent/indent shapes including conical shapes, and even flat complimentary faces (e.g., a detent sized large enough to allow detent screw 150 to turn) between detent screw 150 and pin 130 may be used.

Detent screw 150 may be used in the manner discussed above, to provide a compression force through a detent screw hole 145N from a periphery of rotor 105 in a direction towards shaft aperture 110. Detent screw hole 145N may extend into rotor aperture 140 which may allow pin 130 to connect between knife blades 115N and 115N+1.

Figure 6C:
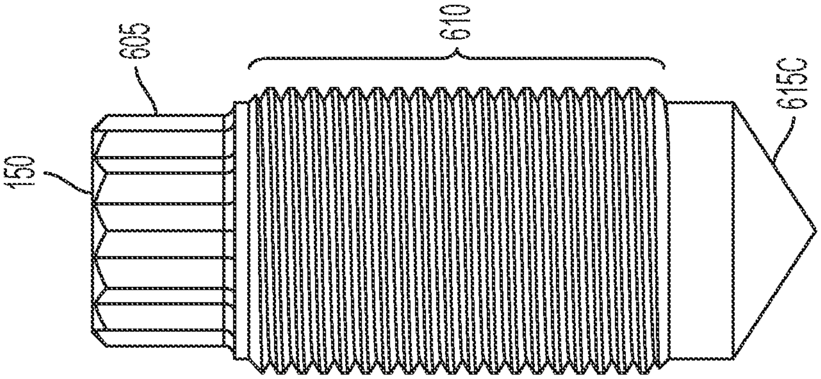
FIG. 6C illustrates a side view of a third embodiment of a detent screw associated with the shredder blade assembly.
Figure 6B:
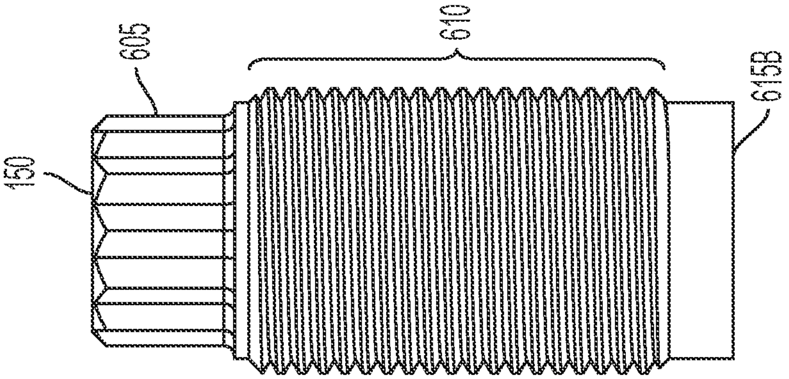
FIG. 6B illustrates a side view of a second embodiment of a detent screw associated with the shredder blade assembly.

FIG. 6B illustrates a side view of a second embodiment of a detent screw 150 associated with shredder blade assembly 100, shown in FIG. 1. As shown, detent screw 150 includes a head 605 which may be similar to a bolt head that may either include an external bearing surface (as shown in FIG. 6B) or a socket bearing surface like, for example, a Torx® or allen bolt. Detent screw 150 may include threaded section 610 which mates with rotor 105 at detent screw hole 145N. As shown in FIG. 6B, detent screw 150 is fitted with a flat face outdent 615B which serves as an interface between detent screw 150 and detent 135 of pin 130, as previously discussed. Flat face outdent 615B may be round about a circumference of detent screw 150. A corresponding flat face detent 135 may be disposed on pin 130, as previously discussed to accept flat face outdent 615B of detent screw 150 shown in FIG. 6B.

Detent screw 150, shown in FIG. 6B, may also be used in the manner discussed above, to provide a compression force through a detent screw hole 145N from a periphery of rotor 105 in a direction towards shaft aperture 110. Detent screw hole 145N may extend into rotor aperture 140 which may allow pin 130 to connect between knife blades 115N and 115N+1.

FIG. 6C illustrates a side view of a third embodiment of a detent screw 150 associated with shredder blade assembly 100, shown in FIG. 1. As shown, detent screw 150 includes a head 605 which may be similar to a bolt head that may either include an external bearing surface (as shown in FIG. 6C) or a socket bearing surface like, for example, a Torx® or allen bolt. Detent screw 150 may include threaded section 610 which mates with rotor 105 at detent screw hole 145N. As shown in FIG. 6C, detent screw 150 may be fitted with a conical outdent 615C which serves as an interface between detent screw 150 and detent 135 of pin 130, as previously discussed. A corresponding conical detent 135 may be disposed on pin 130, as previously discussed to accept conical outdent 615C of detent screw 150 shown in FIG. 6C.

Detent screw 150, shown in FIG. 6C, may similarly be used in the manner discussed above, to provide a compression force through a detent screw hole 145N from a periphery of rotor 105 in a direction towards shaft aperture 110. Detent screw hole 145N may extend into rotor aperture 140 which may allow pin 130 to connect between knife blades 115N and 115N+1.

The foregoing implementations and techniques significantly reduce machine downtime by drastically increasing the simplicity of rotating, reversing, or replacing knife blades on a shredding machine.

The foregoing description is presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

The invention claimed is:

1. A shredder blade assembly, comprising:

a rotor having a plurality of pockets, the plurality of pockets being disposed on both sides of the rotor such that pockets on opposing sides of the rotor are aligned, each one of the plurality of pockets including a rotor aperture;

a detent screw having an outdented end;

a plurality of knife blades sized to fit the shape of the plurality of pockets, each one of the plurality of knife blades including three discrete cutting edges spaced around a periphery of the knife blade;

a pin, the pin receiving a compression force from a periphery of the rotor by contact from the outdented end of the detent screw in a detent of the pin, the pin extending through two of the plurality of knife blades on the rotor and through the rotor aperture; and wherein each of the plurality of knife blades is disposed in one of the plurality of pockets and secured into the pockets by the compression force applied from the detent screw from the periphery of the rotor and in a direction towards a shaft aperture in the rotor, the pin positioned within the rotor aperture transfers the compression force from the detent screw from the periphery of the rotor to the plurality of knife blades to secure the two of the plurality of knife blades in two of the plurality of pockets, wherein the two of the plurality of knife blades are placed on opposing sides of the rotor and are each secured in individual pockets, on opposing sides of the rotor, by the same compression force that is applied from the periphery of the rotor transferred through the pin, wherein the detent screw is disposed in the periphery of the rotor directly between the two of the plurality of knife blades and at a midpoint between the opposing sides of the rotor.

2. The shredder blade assembly of claim 1, wherein each of the two of the plurality of knife blades includes a pinning aperture.

3. The shredder blade assembly of claim 2, wherein the pin connects the two of the plurality of knife blades to one another.

4. The shredder blade assembly of claim 3, wherein a shape of the rotor aperture is different than a shape of one of the plurality of pinning apertures.

5. The shredder blade assembly of claim 4, wherein the pin comprises two separate pin portions that assemble to form the pin.

6. The shredder blade assembly of claim 4, wherein the detent screw is screwed in from the periphery of the rotor in the direction of the shaft aperture in the rotor.

7. A shredder blade rotor, comprising:

a rotor body comprising a plurality of pockets, the plurality of pockets being disposed on both sides of the rotor such that pockets on opposing sides of the rotor are aligned;

a plurality of rotor apertures singularly disposed on an inside surface of each of the plurality of pockets; and a plurality of detent screw holes each disposed in a periphery of the rotor body and extending through the rotor to one of the plurality of rotor apertures, the plurality of detent screw holes each receiving a head of a detent screw such that the head of each detent screw is disposed within the rotor, wherein two of a plurality of knife blades, which both include three discrete cutting edges spaced around a periphery of each of the two of the plurality of knife blades are sized to fit the shape of the plurality of pockets;

wherein each of the plurality of knife blades are placed on opposite sides of the rotor and are secured in individual pockets, on opposite sides of the rotor, by a compression force applied by the detent screws disposed in the plurality of detent screw holes from the periphery of the rotor, the compression force pressing the two of the plurality of knife blades towards a shaft aperture in the rotor and securing the two of the plurality of knife blades in two of the plurality of pockets, wherein each of the plurality of detent screw holes is disposed in the periphery of the rotor directly between two of the plurality of knife blades placed on opposite sides of the rotor body and at a midpoint between the two opposite sides of the rotor.

8. The shredder blade rotor of claim 7, wherein each one of the plurality of pockets further includes a knife blade recess.

9. The shredder blade rotor of claim 7, further comprises:

a plurality of agitation knives.

10. A shredder blade assembly, comprising:

a plurality of knife blades having three discrete cutting edges spaced around a periphery of the knife blade, the plurality of knife blades being disposed on opposing sides of a rotor such that each knife blade of the plurality of knife blades is aligned with one of the plurality of knife blades on the opposing side of the rotor, wherein first knife blade, among the plurality of knife blades, is disposed on one side of the rotor and is connected to a second knife blade, among the plurality of knife blades, on the opposing side of the rotor, relative to the first knife blade, by a single pin extending through a rotor aperture, wherein the pin transfers a compression force from a periphery of the rotor to secure the first knife blade and second knife blade into individual pockets in the rotor; and a detent screw hole which receives a head of a detent screw such that the head of the detent screw is disposed within the rotor, the detent screw hole extending from the periphery of the rotor to the rotor aperture, wherein the detent screw hole is disposed in the periphery of the rotor directly between the first knife blade and the second knife blade and at a midpoint between the two opposing sides of the rotor.

11. The shredder blade assembly of claim 10, wherein the plurality of knife blades are rotatable and reversible on the rotor to expose the three discrete edges on each of a front side and back side of the rotor.

12. The shredder blade assembly of claim 10, wherein each one of the plurality of knife blades includes the three discrete cutting edges includes an inside cutting edge and three other discrete cutting edges an outside cutting edge on each one of the plurality of knife blades.

13. The shredder blade assembly of claim 10, wherein each of the plurality of knife blades further includes a pinning aperture having a complimentary shape for receiving and connecting to the pin.

14. The shredder blade assembly of claim 10, wherein the detent screw applies the compression force to the pin in the rotor aperture.

15. The shredder blade assembly of claim 10, wherein the detent screw includes an outdent that aligns with an indent on the pin in the rotor aperture to secure the knife blades to the rotor.

* * * * *